United States Patent
Wang

(10) Patent No.: US 9,251,383 B2
(45) Date of Patent: Feb. 2, 2016

(54) DEVICE FOR PREVENTING LOGGING OF COMPUTER ON-SCREEN KEYBOARD

(71) Applicant: Chi-Pei Wang, Hsinchu (TW)

(72) Inventor: Chi-Pei Wang, Hsinchu (TW)

( * ) Notice: Subject to any disclaimer, the term of this patent is extended or adjusted under 35 U.S.C. 154(b) by 0 days.

(21) Appl. No.: 14/078,984

(22) Filed: Nov. 13, 2013

(65) Prior Publication Data

US 2014/0157003 A1    Jun. 5, 2014

(30) Foreign Application Priority Data

Nov. 30, 2012  (TW) .............................. 101223188 U

(51) Int. Cl.
*H04L 9/32* (2006.01)
*G06F 21/83* (2013.01)

(52) U.S. Cl.
CPC ...................................... *G06F 21/83* (2013.01)

(58) Field of Classification Search
CPC . G06F 21/83; G06F 2221/031; H04L 63/083; H04L 63/10
USPC ........................................................ 713/189
See application file for complete search history.

(56) References Cited

U.S. PATENT DOCUMENTS

| | | | |
|---|---|---|---|
| 2008/0282160 A1* | 11/2008 | Tonnison et al. | 715/704 |
| 2009/0044282 A1* | 2/2009 | Govindaraju | 726/27 |
| 2012/0079282 A1* | 3/2012 | Lowenstein et al. | 713/189 |
| 2012/0254761 A1* | 10/2012 | DeWitt | 715/733 |

\* cited by examiner

*Primary Examiner* — Dant Shaifer Harriman
*Assistant Examiner* — Abiy Getachew
(74) *Attorney, Agent, or Firm* — Egbert Law Offices, PLLC

(57) ABSTRACT

A device for preventing logging of computer on-screen keyboard has a pointer device and tandem device. The pointer device comprises a first transmission interface to connect the host computer, and an encryption module to encrypt and transfer data of the pointer device to the first transmission interface. This data contains pointer coordinates. A pointer data module is used to obtain, convert and save the coordinate data of the pointer device. A push-button data module is used to obtain, convert and save the push-button data of the existing pointer device. A physical interface module is used to obtain coordinates of the pointer device and original data of key events. The original data is converted into coordinates or push-button data of the pointer device by the pointer and push-button data modules. Then the encryption module decides if it is necessary to transfer the coordinate or push-button data in the form of encryption.

7 Claims, 2 Drawing Sheets

DEVICE FOR PREVENTING LOGGING OF COMPUTER ON-SCREEN KEYBOARD

CROSS-REFERENCE TO RELATED U.S. APPLICATIONS

Not applicable.

STATEMENT REGARDING FEDERALLY SPONSORED RESEARCH OR DEVELOPMENT

No applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a data protection technology for computer devices (e.g. mouse, optical pen, touchpad and touch screen, etc.), and more particularly to an innovative one which is designed to prevent the input data of computer pointing devices from being obtained by on-screen logging software.

2. Description of Related an Including Information Disclosed Under 37 CFR 1.97 and 37 CFR 1.98.

Computer products are utilized in such a manner that on-screen keyboard is often used to input accounts and passwords in addition to data input via a physical keyboard. Yet, existing on-screen logging software enables logging of the computer screen to obtain data input by on-screen keyboard, leading to leakage of important secrets of the users.

In view of prevailing computer-related encryption technologies and products, though anti-logging encryption products and file encryption software have been launched, the current encryption products cannot yet solve the aforementioned problem of logging against on-screen keyboard, so the users important secrets are still exposed to possible leakage due to imperfect anti-logging functions. For example, the prior art is provided with a virtual keyboard activated during login to the system server. Each of the key is composed of 16 images, which are presented by quick screening, allowing to watch every keyed word using the visual reaction with retentive power. The keying positions will be updated upon clicking. So, only fragmentary images could be acquired by the logging procedure when capturing the screen by clicking the keys. However, since the keying positions are often changed, such an on-screen anti-logging method makes it difficult and time-consuming for identification by the users. Moreover, such a virtual keyboard system is applied in a limited range since it must be provided by the system operators. Furthermore, such on-screen anti-logging method may also be exposed to hackers by virtue of an improved on-screen logging means. Another CAPTCHA dynamic text code system allows the users to select the pass graph and the capturing rule for the lower dynamic words. Such anti-logging technology could avoid the attack from keyboard logging and asterisk password removal, but when the on-screen capturing procedures have taken multiple login pictures, the pass graphs and capturing rule could also be composed by the hackers.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

Based on the unique technical characteristics of the present invention that the pointer device or tandem device with encryption module is applied for decryption in conjunction with the application software, the clicking, events of the pointer device are not presented on the computer screen, so on-screen logging software could not obtain the real clicking images by capturing computer screen images (note: the on-screen logging software triggers the logging by detecting the pointer device's clicking events), thus efficiently realizing anti-logging of input information via computer on-screen keyboard.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
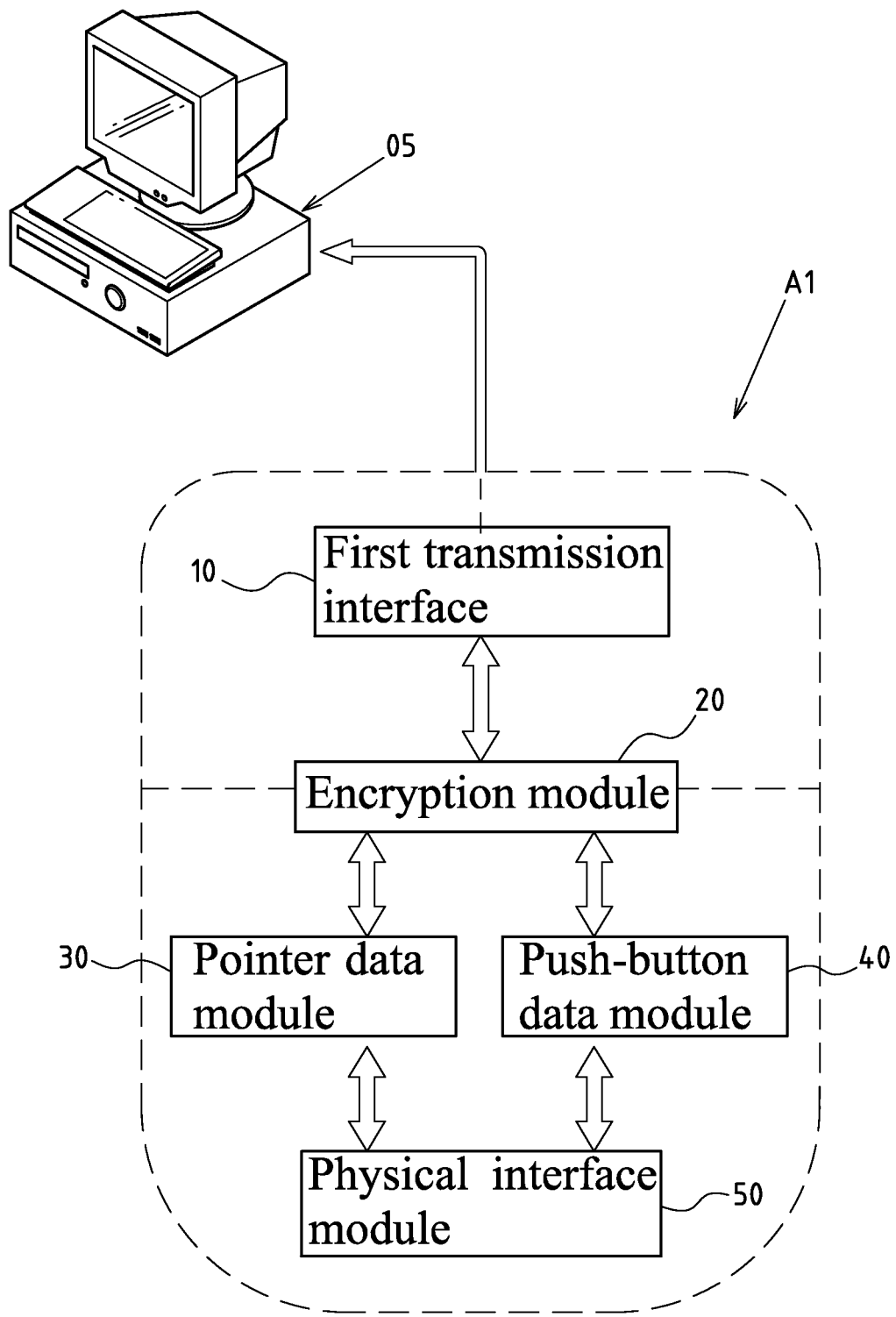
FIG. 1 is an application view of the present invention as a pointer device.

FIG. 1 depicts a preferred embodiment of a device of the present invention for preventing togging of computer on-screen keyboard, which, however, is provided, for only explanatory objective for patent claims.

Said device of the present invention can be designed into a pointer device A1 (including: mouse, optical pen, touchpad and touch screen: a mouse pattern shown hereto), which comprises: a first transmission interface 10, used to connect the host computer 05; an encryption module 20, used to encrypt and transfer data of the pointer device A1 to the first transmission interface 10, data of said pointer device A1 contains pointer coordinates or the events of left, middle and right keys; a pointer data module 30, used to obtain, convert and save coordinate data of the pointer device A1; a push-button data module 40, used to obtain, convert and save push-button data of the pointer device A1; and a physical interface module 50, used to obtain the coordinates of pointer device A1 and original data of key events.

Thus, the original data obtained by physical interface module 50 shall be converted into the coordinates or push-button data of the pointer device A1 by the pointer data module 30 and push-button data module 40. Then, the encryption module 20 decides if it is necessary to transfer the coordinates or push-button data in the form of encryption, thereby preventing logging of the computer on-screen keyboard.

Of which, said pointer device A1 can be mated with a keyboard to form an integrated device of encrypted keyboard and pointer with software encryption functions, as illustrated by another embodiment of said pointer device.

Figure 2:
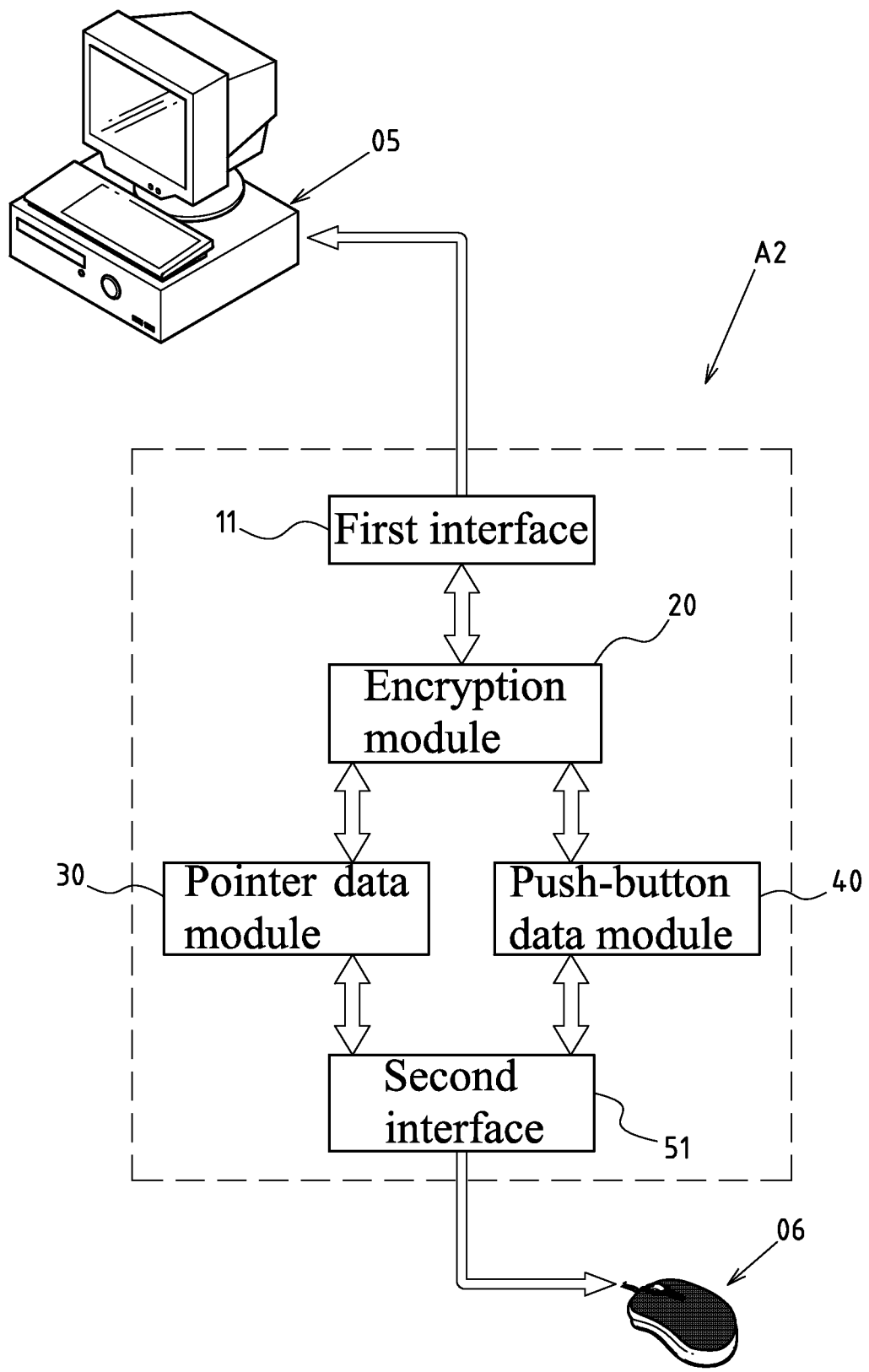
FIG. 2 is an application view of the present invention as a tandem device.

Said device of the present invention can be designed into a tandem device (as shown in FIG. 2). Said tandem device A2 is used to connect the host computer 05 and an existing pointer device 06 for controlling the host computer 05 (note: existing pointer device referred hereto is a conventional one, rather than said pointer device A1 defined in the present invention). Said tandem device A2 comprises: a first interface 11, used to connect the host computer 05; an encryption module 20, used to encrypt and transfer data of existing pointer device 06 to the first interface 11 the data of existing pointer device 06 contains the pointer coordinates or the events of left, middle and right keys; a pointer data module 30, used to convert and save the coordinate data of existing pointer device 06; a push-button data nodule 40, used to convert, and save the push-button data of existing pointer device 06; and a second interface 51, used to obtain the coordinates and push-button data of existing pointer device 06.

Thus, the coordinates and push-button data of the existing pointer device 06 can be obtained from the second interface 51, then converted into and saved as the coordinates or push-button data of new pointer device by the pointer data module 30 and push-button data module 40. Then, the encryption module 20 decides if it is necessary to transfer the coordinates or push-button data in the form of encryption, thereby preventing logging of the computer on-screen keyboard.

Of which, said first interface 11 and second interface 51 are of wireless or wired plug-in type. Moreover, said pointer device 06 also comprises mouse, optical pen, touchpad and touch screen, etc. An existing pointer device 06 in FIG. 3 is shown as is mouse.

I claim:

1. A system for preventing logging of an on-screen keyboard of a computer, the system comprising:

a first transmission interface device connected to a host computer; a pointer device; an encryption module for encrypting and transferring data of said pointer device to said first transmission interface device, the data of said pointer device containing pointer coordinate data and a push-button clicking event by pressing a left key or a middle key or a right key so as to produce a control signal, said encryption module only encrypting the push-button clicking event; a pointer data module configured to obtain and to convert and to save the pointer coordinate data of said pointer device;

a push-button data module configured to obtain to convert and to save push-button data of said pointer device; and a physical interface module configured to obtain coordinates of said pointer device and original data of key events, the original data obtained by said physical interface module being converted into the coordinates or the push-button data of said pointer device by said pointer data module and by said push-button data module, said encryption module configured to encrypt and transfer the coordinates or the push-button data in an encrypted form, said pointer device configured to produce clicking events, said encryption module encrypting the push-button clicking event to conceal the clicking event so that an on-screen logging software cannot obtain a trigger point of images capturing the screen of the computer, an encrypted clicking events presented on the screen of the computer such that on-screen logging software cannot obtain images of the encrypted clicking events by capturing images of the screen of the computer so as to prevent logging of the on-screen keyboard of the computer.

2. The system of claim 1, said pointer device selected from the group consisting of a mouse, an optical pen, a touch pad and a touchscreeen.

3. The system of claim 1, said pointer device being mated with a keyboard so as to form an integrated encrypted keyboard and pointer device with a software encryption function.

4. A tandem system for preventing logging of an on-screen keyboard which is used to connect a host computer and an existing pointer device for controlling the host computer, the tandem system comprising:

a first interface device configured to connect to the host computer; an encryption module configured to encrypt and transfer data of the existing pointer device to said first interface device, the data of the existing pointer device containing pointer coordinates and a push-button clicking event by pressing a left key or a middle key or a right key so as to produce a control signal, said encryption module only encrypting the push-button clicking event; a pointer data module configured to converted and save the pointer coordinate data; a push-button data module configured to convert and save push-button data of the existing pointer device; and a second interface configured to obtain the pointer coordinate data and the push-button data of the pointer device;

a new pointer device, said pointer data module and said push-button data module configured to convert and save pointer coordinate data and push-button data of the existing pointer device as pointer coordinate data and push-button data of said new pointer device, said encryption module configured to encrypt and to transfer the pointer coordinate data or the push-button data in an encrypted form, the existing pointer device and said new pointer device each having clicking events, said encryption module encrypting the push-button clicking event to conceal the clicking event so that an on-screen logging software cannot obtain a trigger point of images capturing the screen of the computer, an encrypted clicking events are presented on the screen of the computer such that on-screen logging software cannot obtain images of the encrypted clicking event by capturing images from the screen of the computer so as to prevent logging of the on-screen keyboard.

5. The tandem system of claim 4, said first and second interfaces being wireless.

6. The tandem system of claim 4, said first and second interfaces being wired plug-ins.

7. The tandem system of claim 4, said new pointer device selected from the group consisting of a mouse, an optical pen, a touchpad and a touch screen.

* * * * *